June 24, 1952 W. E. WITHALL Re. 23,515

FRICTION SNUBBER FOR RAILWAY CAR TRUCK SPRINGS

Original Filed July 21, 1949

Inventor:
William E. Withall
By Henry Fuchs
Atty.

Reissued June 24, 1952 Re. 23,515

UNITED STATES PATENT OFFICE 23,515

FRICTION SNUBBER FOR RAILWAY CAR TRUCK SPRINGS

William E. Withall, Hinsdale, Ill., assignor to W. H. Miner, Inc., Chicago, Ill., a corporation of Delaware Original No. 2,554,606, dated May 29, 1951, Serial No. 106,033, July 21, 1949. Application for reissue April 4, 1952, Serial No. 280,559

6 Claims. (Cl. 267—9)

Matter enclosed in heavy brackets [ ] appears in the original patent but forms no part of this reissue specification; matter printed in italics indicates the additions made by reissue.

This invention relates to improvements in friction shock absorbers, especially adapted for use in connection with truck springs of railway cars for snubbing or dampening the action of the springs.

One object of the invention is to provide a friction shock absorber of the character indicated, including a casing, and a yielding resisted friction clutch, slidingly telescoped within the casing, including a wedge and cooperating friction shoes, wherein the wedge has its movement inwardly of the casing yieldingly opposed at the end of the compression stroke by means acting independently of the means which yieldingly resists movement of the shoes, to provide high resistance to absorb the heavier shocks at the end of the compression stroke of the mechanism and prevent oversolid compression of said mechanism.

A more specific object of the invention is to provide a friction shock absorber, comprising a casing, yieldingly resisted friction shoes slidingly telescoped within the casing, a follower movable toward and away from the casing and having a wedge thereon in wedging engagement with the shoes, wherein yielding cushioning means in the form of a rubber pad is carried on said follower, adapted to be compressed between said follower and the casing during the last part of the compression stroke to absorb the excessively heavy shocks to which the mechanism is subjected in service and prevent direct engagement of the follower with the casing at the end of the compression stroke.

Other objects of the invention will more clearly appear from the description and claims hereinafter following.

Figure 1:
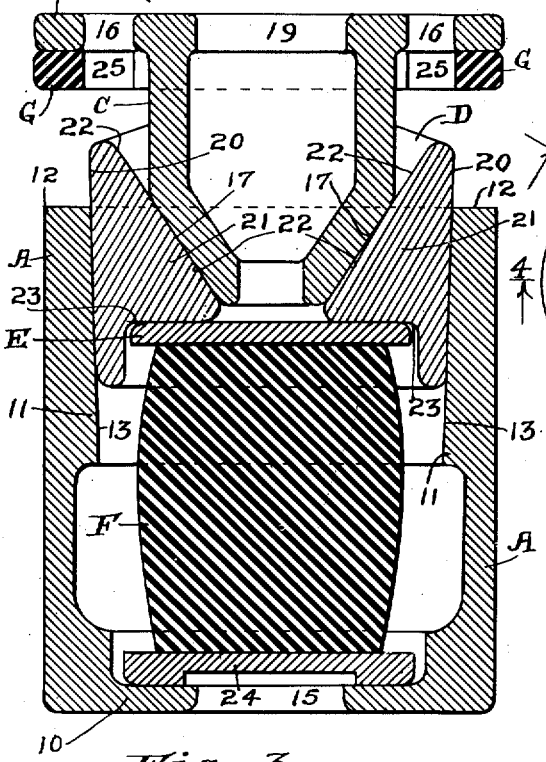
Figure 2:
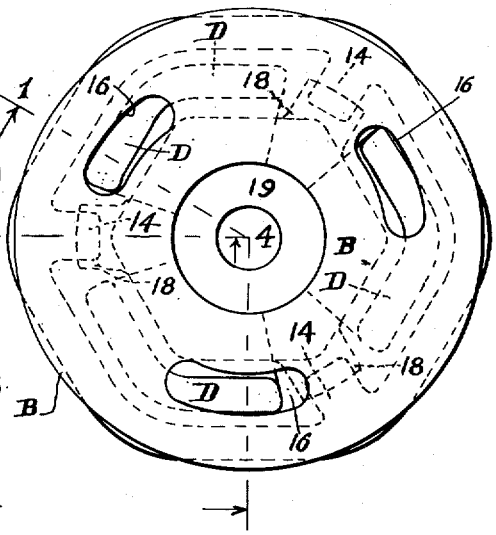
Figure 3:
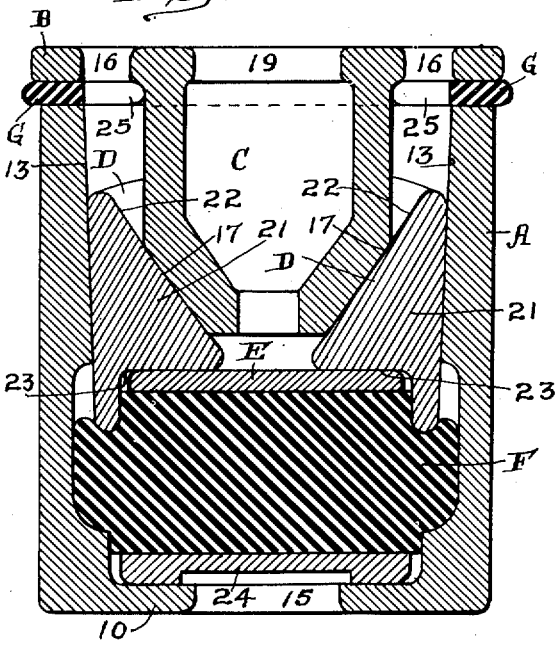
Figure 4:
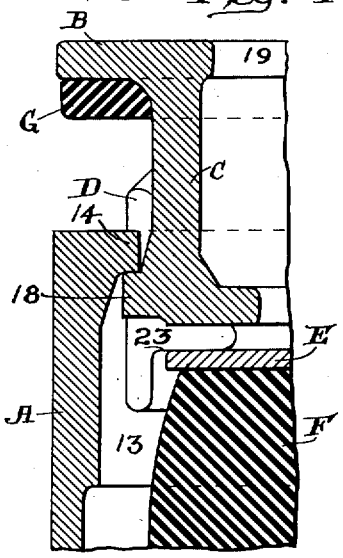

In the accompanying drawing forming a part of this specification, Figure 1 is a vertical sectional view of my improved friction shock absorber, said section being taken on two intersecting planes 120 degrees apart and corresponding substantially to the line 1—1 of Figure 2. Figure 2 is a top plan view of Figure 1. Figure 3 is a view similar to Figure 1, showing the mechanism fully compressed. Figure 4 is a broken, vertical sectional view, taken on the line 4—4 of Figure 2.

As shown in the drawing, my improved friction shock absorber comprises broadly a friction casing A, a follower B, a wedge C, three friction shoes D—D—D, a follower disc E, a rubber cushioning element F, and a rubber pad G carried by the follower B.

The friction casing A is in the form of a tubular member of substantially hexagonal, transverse cross section, open at its upper end and having a transverse bottom wall 10 at its lower end. At the open upper end thereof, the side walls of the casing are inwardly thickened, as shown in Figures 1, 2, and 4, to provide a friction shell section 11. The casing at said open upper end presents a substantially flat end surface 12 surrounding the opening thereof. The friction shell section 11 further presents three longitudinally extending, interior friction surfaces 13—13—13 of V-shaped, transverse cross section, which converge inwardly of the casing. At said open upper end, the casing A has three interior stop lugs 14—14—14, which are alternated with the three friction surfaces 13—13—13. The bottom wall 10 of the casing is provided with a central opening 15 therethrough, adapted to accommodate the usual spring centering projection of the bottom spring plate of a cluster of truck springs of a railway car.

The wedge C is formed integral with the follower B, the wedge being in the form of a hollow block and the follower B being in the form of a laterally outwardly projecting, annular flange at the outer end of the wedge. The follower B is of circular outline, and is provided with three circumferentially spaced openings 16—16—16 therethrough, outwardly of the wedge C, which are utilized in assembling the mechanism, as hereinafter pointed out.

The wedge C has three wedge faces 17—17—17 at its inner end, which are of V-shaped, transverse cross section, and converge inwardly or downwardly of the mechanism. At the inner or lower ends of the wedge faces 17—17—17, the wedge C has three laterally outwardly projecting, radial lugs 18—18—18, which are alternated with the wedge faces, as clearly shown in Figure 2. In other words, the lugs 18—18—18 are arranged so that they are located between adjacent wedge faces and extend between adjacent shoes D—D to engage in back of the lugs 14—14—14 of the casing and restrict outward movement of the wedge. The hollow wedge C presents an opening 19 at the top thereof, adapted to accommodate the usual spring centering projection of the top spring plate of a truck spring cluster.

The three friction shoes D—D—D are of similar design, each shoe having an outer, longitudinally extending, V-shaped friction surface 20, engaged with one of the V-shaped friction surfaces 13 of the casing A. On its inner side each shoe is provided with an enlargement 21, presenting a V-shaped wedge face 22, engaged with one of the wedge faces 17 of the wedge C and correspondingly inclined thereto. At the inner or bottom end, the enlargement of each shoe presents a transversely extending, flat abutment face 23 on which the follower disc E is adapted to bear.

The rubber element F is in the form of an elongated, solid cylinder, slightly tapered toward its opposite ends, as shown in Figure 1. The element F is arranged within the casing A, below the friction shoes D—D—D, being supported on a disclike plate 24, which, in turn, is supported on the bottom wall 10 of the casing and closes the opening 15 of said wall. The element F supports the follower disc E, which is in the form of a flat plate buttressed against the abutment faces 23—23—23 of the shoes D—D—D.

The rubber pad G is in the form of a ringlike washer, surrounding the wedge C and vulcanized to the underneath face of the follower B. The pad G has openings 25—25—25 therethrough, registering with the openings 16—16—16 of the follower B, to provide continuous passages through said follower and pad to admit an assembling tool, as hereinafter pointed out. The rubber pad G extends to the periphery of the follower B and serves as a cushioning element between the follower B and the upper end of the casing A during the last part of the compression stroke of the mechanism.

In assembling the mechanism, the rubber element F is first placed within the casing A in position resting on the plate 24. The follower disc E and the three shoes D—D—D are then placed in position on top of the element F. Next, the wedge C, carrying the follower B and the attached pad G, is placed on top of the shoes and turned so that the lugs 18—18—18 of the wedge are circumferentially offset with respect to the lugs 14—14—14 of the casing so as to clear the latter when the wedge is moved inwardly of the casing. With the parts thus positioned, the shoes D—D—D are depressed by a suitable tool, having prongs inserted through the openings 16—16—16 of the follower B, to such an extent that the upper ends of the shoes reach a position below the lugs 14—14—14 of the casing, which will provide sufficient clearance for rotary displacement of the lugs 18—18—18 of the wedge C. With the parts held in this position, the wedge C is given a partial turn to bring the lugs 18—18—18 in back of the lugs 14—14—14 of the casing in aligned position with the last named lugs. With the wedge in this position, the shoes D—D—D are freed from pressure by withdrawal of the assembling tool, and expansion of the rubber element F forces the shoes to their uppermost position, thereby locking the wedge against rotation and forcing the lugs 18—18—18 of the latter against the lugs 14—14—14 of the casing A.

My improved shock absorber preferably replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the wedge C and the follower B are forced downwardly with respect to the casing A, the wedge spreading the shoes apart and carrying the same inwardly of the casing, against the resistance of the rubber element F, thereby providing progressively increasing resistance as the mechanism is compressed. During this action, the follower B, with the attached rubber pad G, approaches the top of the friction casing, the rubber pad G being forcibly pressed against the upper end of the casing during the last part of the compression stroke of the mechanism to add its resistance to that of the yieldingly resisted friction shoes to take care of the heavier final shocks. Figure 3 shows the rubber pad G being compressed between the flat end surface 12 of the casing and the follower B. As will be evident, the rubber pad G prevents the follower B from going solid against the friction casing and provides cushioning action to the end of the compression stroke. Upon recoil of the truck springs, the actuating force on the follower B and wedge C is reduced, and lengthwise expansion of the rubber element F, in returning to its original shape, returns all of the parts to the normal position shown in Figure 1. Release of the mechanism is initiated by the expansive action of the rubber pad G, which acts to force the wedge C away from the shoes D—D—D to reduce the wedging pressure.

I claim:

1. In a friction shock absorber, the combination with a friction casing open at one end; of friction shoes slidingly telescoped within said open end of the casing; a follower movable toward the casing; a rubber pad on said follower engageable with the open end of said casing after a predetermined amount of compression of the mechanism to be compressed between said follower and casing; a wedge movable toward the casing in unison with said follower, said wedge being in wedging engagement with the shoes, and yielding means within the casing opposing inward movement of said shoes independently of said rubber pad.

2. In a friction shock absorber, the combination with a friction casing; of friction shoes slidingly telescoped within the casing; a wedge in wedging engagement with the shoes; a follower rigid with said wedge; a rubber pad on said follower, surrounding said wedge, said follower and wedge being movable toward and away from the casing, said follower, after movement to a predetermined extent toward said casing, forcing said pad against the casing to compress said pad; and a rubber block within the casing yieldingly opposing inward movement of the shoes.

3. In a friction shock absorber, the combination with a friction casing open at its upper end; of friction shoes slidingly telescoped within the open end of the casing; a follower above said casing movable toward and away from the same; a rubber pad on the underneath side of said follower engageable with the casing after the mechanism has been compressed to a predetermined extent; a wedge block fixed with respect to said follower and having wedging engagement with said shoes; and a rubber block within the casing yieldingly opposing inward movement of said shoes.

4. In a friction shock absorber, the combination with a friction casing open at one end; of a friction clutch slidingly telescoped within said open end of the casing, said clutch including a follower opposed to the open end of said casing; a rubber annulus on the inner side of said follower in alignment with the wall of said casing at said open end and engageable with the outer end of said wall after the mechanism has been compressed to a predetermined extent, less than the full compression stroke of the mechanism; and yielding means within the casing inwardly of said clutch for opposing inward movement of said clutch.

*5. In a friction shock absorber, the combination with a friction casing member, open at one end; of friction shoes slidingly telescoped within said open end of the casing member; a follower member movable toward said open end of the casing member; a rubber pad between said follower member and casing member, said pad being disposed on one of said members and engageable with the other of said members after a predetermined amount of compression of the mechanism to be compressed between said follower member and casing member; a wedge movable toward the casing member in unison with said follower member, said wedge being in wedging engagement with the shoes; and yielding means within the casing member opposing inward movement of said shoes independently of said rubber pad.*

*6. In a friction shock absorber, the combination with a friction casing member; of friction shoes slidingly telescoped within the casing member; a wedge in wedging engagement with the shoes; a follower member with which said wedge is movable; a rubber pad on one of said members disposed laterally outwardly beside said wedge, said follower member and wedge being movable toward and away from the casing member, said rubber pad being compressed between said members after movement to a predetermined extent of one of said members toward the other member; and yielding means within the casing member opposing inward movement of the shoes.*

WILLIAM E. WITHALL.

REFERENCES CITED

The following references are of record in the file of this patent or the original patent:

UNITED STATES PATENTS

| Number | Name | Date |
|---|---|---|
| 1,988,427 | Barrows | Jan. 15, 1935 |
| 2,254,781 | Rabbitt | Sept. 2, 1941 |
| 2,276,228 | Cottrell | Mar. 10, 1942 |
| 2,335,847 | Dath | Dec. 7, 1943 |
| 2,356,481 | Thornhill | Aug. 22, 1944 |
| 2,410,933 | Freeman | Nov. 12, 1946 |
| 2,469,549 | Dath | May 10, 1949 |